(12) United States Patent
Friedsam et al.

(10) Patent No.: US 9,027,340 B2
(45) Date of Patent: May 12, 2015

(54) BRAKE BOOSTER FOR AN AUTOMOTIVE BRAKE SYSTEM AND CORRESPONDING AUTOMOTIVE BRAKE SYSTEM

(75) Inventors: Ludwig Friedsam, Oberdürenbach (DE); Stefan Klöck, Dorweiler (DE)

(73) Assignee: Lucas Automotive GmbH, Koblenz (DE)

( * ) Notice: Subject to any disclaimer, the term of this patent is extended or adjusted under 35 U.S.C. 154(b) by 1083 days.

(21) Appl. No.: 13/003,070

(22) PCT Filed: Jun. 16, 2009

(86) PCT No.: PCT/EP2009/004333
§ 371 (c)(1),
(2), (4) Date: Feb. 15, 2011

(87) PCT Pub. No.: WO2010/003517
PCT Pub. Date: Jan. 14, 2010

(65) Prior Publication Data
US 2011/0131973 A1    Jun. 9, 2011

(30) Foreign Application Priority Data

Jul. 9, 2008    (DE) .......................... 10 2008 032 257

(51) Int. Cl.
*B60T 13/57*    (2006.01)
(52) U.S. Cl.
CPC ..................... *B60T 13/57* (2013.01)
(58) Field of Classification Search
CPC ............................... B60T 13/57; B60T 13/567
USPC ...................... 60/547.2; 91/376 R; 92/169.3; 303/113.3, 115.1, 152
See application file for complete search history.

(56) References Cited

U.S. PATENT DOCUMENTS

| | | | | |
|---|---|---|---|---|
| 4,291,534 A * | 9/1981 | Jones | ........................... | 60/547.1 |
| 4,387,626 A * | 6/1983 | Myers | ......................... | 91/376 R |
| 4,402,256 A * | 9/1983 | Ando | ........................... | 91/369.2 |
| 4,491,058 A * | 1/1985 | Morin | ........................ | 91/376 R |
| 4,522,108 A * | 6/1985 | Takeuchi et al. | ............ | 91/376 R |
| 4,577,548 A * | 3/1986 | Gautier | ....................... | 91/369.2 |

(Continued)

FOREIGN PATENT DOCUMENTS

| DE | 3413739 A1 | 10/1985 |
|---|---|---|
| DE | 19718375 A1 | 1/1998 |

(Continued)

*Primary Examiner* — Thomas E Lazo
(74) *Attorney, Agent, or Firm* — MacMillan, Sobanski & Todd, LLC

(57) ABSTRACT

A brake booster with regenerative brake force generation comprising a force input element coupled to a brake pedal. A chamber arrangement having a vacuum chamber and a working chamber that are separated from one another by a movable wall. A control valve actuated in accordance with a displacement of the force input element. The working chamber is connectable selectively to the vacuum chamber and the atmosphere to generate and reduce a differential pressure at the movable wall. The control valve has a control valve housing that is connected for joint movement to the movable wall. In a first actuation phase of the brake booster from its rest position, the force input element is displaceable relative to the control valve housing by an idle travel, in which the control valve remains non-actuated to suppress a build-up of a differential pressure at the movable wall.

23 Claims, 5 Drawing Sheets

(56) References Cited

U.S. PATENT DOCUMENTS

| | | | | |
|---|---|---|---|---|
| 4,641,568 | A | * | 2/1987 | Boehm et al. ............... 91/369.2 |
| 5,245,829 | A | * | 9/1993 | Osterday et al. ............. 60/547.1 |
| 6,006,520 | A | * | 12/1999 | Zehnder et al. ................ 60/415 |
| 6,672,198 | B2 | * | 1/2004 | Friedsam et al. ............... 91/367 |
| 6,681,680 | B2 | * | 1/2004 | Schluter ......................... 91/367 |
| 6,843,160 | B2 | * | 1/2005 | Takasaki et al. ............ 91/369.1 |
| 7,347,510 | B2 | * | 3/2008 | Schluter .................... 303/114.1 |
| 7,685,926 | B2 | * | 3/2010 | Mori ........................... 91/376 R |
| 8,215,226 | B2 | * | 7/2012 | Watanabe ................... 91/369.2 |
| 2006/0043788 | A1 | * | 3/2006 | Schluter .................... 303/113.4 |
| 2008/0150354 | A1 | | 6/2008 | Ohlig et al. |
| 2009/0302673 | A1 | | 12/2009 | Linhoff |

FOREIGN PATENT DOCUMENTS

| | | |
|---|---|---|
| DE | 102004005107 A1 | 8/2005 |
| DE | 102004012260 B3 | 9/2005 |
| DE | 102006055765 A1 | 1/2008 |
| DE | 102006061022 A1 | 6/2008 |
| DE | 102007039182 A1 | 2/2009 |
| EP | 1955914 A2 | 8/2008 |
| WO | 2006029353 A2 | 3/2006 |

* cited by examiner

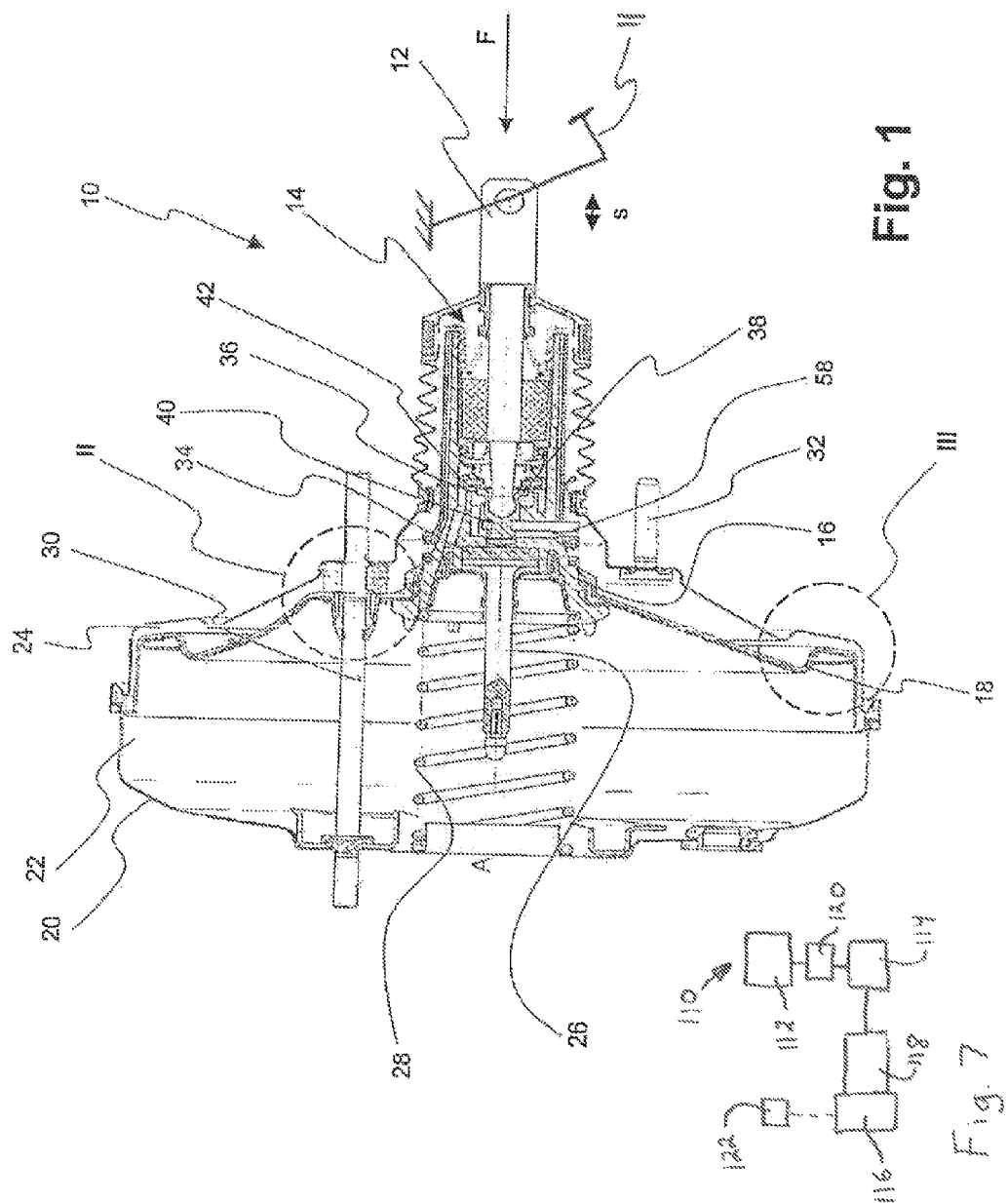

BRAKE BOOSTER FOR AN AUTOMOTIVE BRAKE SYSTEM AND CORRESPONDING AUTOMOTIVE BRAKE SYSTEM

CROSS-REFERENCE TO RELATED APPLICATIONS

This application is a national stage of International Application No. PCT/EP2009/004333 filed Jun. 16, 2009, the disclosure of which is incorporated herein by reference, and which claimed priority to German Patent Application No. 10 2008 032 257.1 filed Jul. 9, 2008, the disclosure of which is incorporated herein by reference.

BACKGROUND OF THE INVENTION

The present invention relates to a brake booster for an automotive brake system with regenerative brake force generation, comprising: a force input element that may be or is coupled to a brake pedal, a chamber arrangement having a vacuum chamber and a working chamber that are separated from one another by a movable wall, a control valve, by means of which in accordance with a displacement of the force input element the working chamber is connectable selectively to the vacuum chamber and the atmosphere to generate and reduce a differential pressure at the movable wall, wherein the control valve has a control valve housing that is connected for joint movement to the movable wall.

For some time now brake boosters have been a component part of modern automotive brake systems. They are used to boost the brake force exerted by a driver on a brake pedal by means of a synthetically generated servo force in order to enable comfortable actuation of the braking system of the motor vehicle. In other words, a conventional brake booster ensures that a driver has to apply a lower actuating force to the brake pedal for actuating the brake system than would be the case without a brake booster. More recently, brake boosters have been used increasingly to activate the brake system independently of the driver. In this connection, in addition to the generic term "brake booster", the term "brake force generator" is also frequently employed. Such a driver-independent actuation is required for example when drive assist systems carry out an activation of the brake system independently of the driver, for example in the event of hazardous situations or in the event of excessive or too weak actuation by the driver.

A conventional vacuum brake booster is known for example from the document DE 34 13 739 A1. In addition to the conventional booster function, in this prior art it is provided that the air flows, which arise in the brake booster during actuation and may have relatively high flow rates, are guided by means of individual vanes of an air guide element in a desired manner in order to prevent turbulence that may lead to undesirable noise generation.

Conventional brake boosters are used also in the hybrid vehicles that have recently become popular. Such vehicles are characterized by having, in addition to an internal combustion engine, a second alternative drive source, for example an electric motor that may simultaneously also be used regeneratively. In this case it is provided that the electric motor is used for example during braking of the vehicle as a generator, wherein the energy demand for this purpose brings about a deceleration of the motor vehicle. Experience has shown that in specific operating situations such a regenerative deceleration of the motor vehicle is in fact sufficient to cover the deceleration effect requested by the driver through an actuation of the brake pedal. In the case of more powerful braking operations, in particular emergency braking operations, however, this deceleration effect is far from being able to cover the requested deceleration demand. It is therefore necessary, in addition to the deceleration effect produced by the electric motor acting as a generator, also to enable a braking of the motor vehicle by means of a conventional braking system.

Conventional brake boosters, such as are described for example in the document DE 34 13 739 A1, do however have the drawback of responding immediately upon a brake pedal actuation. This is briefly explained with reference to the accompanying FIG. 6, which shows essential components of a conventional brake booster in a starting position. In this starting position of the brake booster a valve element 1 lies sealingly against a first sealing seat 2 of a control valve housing 3. A second sealing seat 4 of a transmission element 5, which is coupled for joint movement to a force input element 6, moreover likewise lies sealingly against the valve element 1. The first sealing seat 2 in the illustrated position separates a working chamber from a vacuum chamber. The second sealing seat 4 in the illustrated position separates the working chamber from the ambient atmosphere. If the force input element 6 is then moved as a result of a brake pedal actuation out of the position shown in FIG. 6, this leads directly to a separation of second sealing seat 4 and valve element 1 and hence to a fluidic connection between working chamber and ambient atmosphere. A pressure difference consequently builds up at a movable wall 7. In other words, the brake booster according to prior art responds immediately to a pedal actuation. This immediate response of the brake booster to a brake pedal actuation considerably complicates use of the brake booster in hybrid vehicles. In particular, with such brake boosters a coordination between the deceleration effect produced by the electric motor and the deceleration effect produced by the conventional braking system is difficult.

BRIEF SUMMARY OF THE INVENTION

Against this background, one feature of the present invention is to provide a brake booster of the initially described type that is better suited for use in automotive brake systems with regenerative brake force generation.

This feature is achieved by a brake booster of the initially described type, in which it is provided that in a first actuation phase of the brake booster from its rest position the force input element is displaceable relative to the control valve housing by an idle travel, in which the control valve remains non-actuated to suppress a build-up of the differential pressure at the movable wall.

According to one feature of the invention, the brake booster, upon an actuation of the brake pedal and a resulting displacement of the force input element accordingly, remains initially passive in the first actuation phase, i.e. at the movable wall. No pressure difference is generated in this first actuation phase despite actuation of the brake pedal and displacement of the force input element. In this first actuation phase, which is determined by the dimensioning of the idle travel, the deceleration effect may ensue exclusively as a result of the driving of the electric motor or some other energy-generating device. Although the driver has actuated the brake pedal and experiences a deceleration effect, namely as a result of driving of the electric motor or an alternative energy source, the conventional automotive brake system is initially still passive in this first actuation phase.

According to a development of the invention, it may be provided that the control valve, in the first actuation phase, provides a fluidic connection between vacuum chamber and working chamber and in a second actuation phase after completion of the idle travel by the force input element, the control valve switches over to build up a differential pressure at the movable wall. This means that it is only after exceeding of the idle travel and after termination of the first actuation phase that an activation of the automotive brake system occurs, wherein with the start of this second actuation phase, the brake booster is activated in a, as such, conventional—but delayed—manner. In this connection, it may be provided that with the start of the second actuation phase initially, the deceleration effect of the electric motor is maintained, or alternatively the electric motor is uncoupled from the drive train, so that the deceleration effect occurs exclusively by means of the conventional brake system of the vehicle.

In order to realize this mode of operation, a form of construction of the invention provides that the control valve has a valve element that may be laid sealingly against a first sealing seat, which is formed on the control valve housing and used for the fluidic separation of vacuum chamber and working chamber, and that may be laid sealingly against a second sealing seat, which is formed on a transmission element and used for the fluidic separation of working chamber and ambient atmosphere, wherein in the first actuation phase, the first sealing seat is lifted off the valve element and the second sealing seat lies sealingly against the valve element. Consequently, unlike in the prior art discussed in the introduction with reference to FIG. 6, in the starting position according to the present invention, the two sealing seats do not necessarily lie against the valve element. Rather, during the first actuation phase, there is a fluidic connection between vacuum chamber and working chamber that is interrupted upon termination of the first actuation phase, whereupon the control valve may be activated upon a further actuation of the force input element.

A development of the invention provides that a stop device may determine the idle travel. In this case it may be provided that the stop device is formed on the control valve housing and retains the control valve housing in a starting position associated with the rest position. In other words, the control valve housing is retained in a starting position, from which it is displaced only after completion of the idle travel by the force input element as a result of a switchover of the control valve and a resulting build-up of a pressure difference at the movable wall. For example, according to the invention it may be provided that the stop device 54 is an annular formation, which extends around the control valve housing 16 and in the rest position, as shown in FIG. 5, lies against a counterpart stop formation 100 on the booster housing 20. Alternatively, individual punctiform stop regions may be provided on the control valve housing. As the control valve housing in modern brake boosters is usually manufactured from an injection moulding or die casting material, a development of the invention provides that the stop device is formed integrally on the control valve housing. This substantially simplifies manufacture.

As an alternative to mounting on the control valve housing, according to the invention it may further be provided that the stop device is formed on the movable wall and locks the movable wall in a starting position associated with the rest position. In this connection it may be provided that the stop device is configured in the form of a lay-on element on at least one tie bolt, which extend through the booster housing. A constructional variant in this case provides that the lay-on element is a setting disk or setting nut that is mountable adjustably on the tie bolt. According to the invention it may further be provided that a plurality of lay-on elements are arranged at regular angular intervals in relation to a centre line of the brake force generator.

As an alternative to a stop device that is associated directly with one or more tie bolts, a development of the invention provides that the stop device comprise a lay-on face on the movable wall as well as a corresponding lay-on face on the booster housing.

For controlling the regenerative braking system, in particular for demand-related disconnection of the generator and the deceleration effect thereof, it may be provided that the generator is configured with a displacement detection device for detecting the actuating displacement of the force input element. In this way, it may be reliably determined whether or not the force input element has completed the idle travel.

The invention further relates to an automotive brake system, indicated schematically at 110 in FIG. 7, comprising a braking system 112 associated with individual wheels 114, an electric motor 116 workingly coupled to the drive train 118 of the motor vehicle and usable as a generator, and a brake booster 120, wherein upon an actuation of the force input element in the first actuation phase of the brake booster a deceleration effect occurs by means of the generator effect of the electric motor, wherein a servo force generation by means of a pressure difference at the movable wall does not occur. In this case it may be provided that an electronic control device 122 controls the deceleration effect of the electric motor at least in the first actuation phase.

Other advantages of this invention will become apparent to those skilled in the art from the following detailed description of the preferred embodiments, when read in light of the accompanying drawings.

BRIEF DESCRIPTION OF THE DRAWINGS

FIG. 1 is an axis-containing sectional view of a brake booster according to the invention;

FIG. 7 is a schematic representation of an automotive brake system.

DETAILED DESCRIPTION OF THE INVENTION

Figure 3:
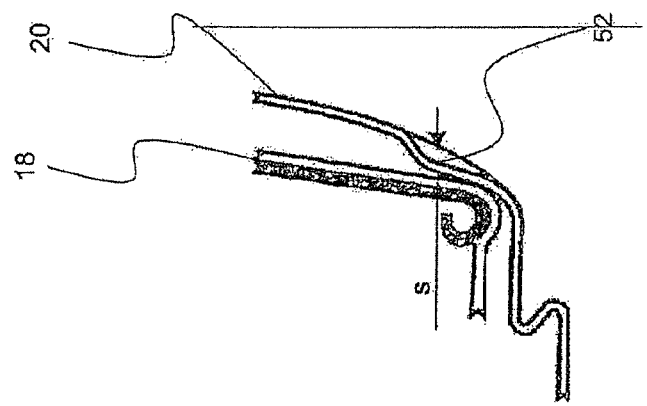
FIG. 3 is an enlarged cut-out view of a region III of FIG. 1, but from a modified alternative form of construction.

In FIG. 1 a brake booster according to the invention is shown in an axis-containing sectional view and denoted generally by 10. It comprises a force input element 12, which may be loaded with a force F via a brake pedal, indicated schematically at 11 in FIG. 1, and is displaceable along a longitudinal axis A.

The force input element 12 extends with a shank-like portion in FIG. 1 to the left along the longitudinal axis A into a control valve 14. The control valve 14 comprises a control valve housing 16, which is displaceable along the longitudinal axis A. The control valve housing 16 is connected in a fixed manner for joint movement to a movable wall 18. The movable wall 18 is guided so as to be displaceable together with the control valve housing 16 in a booster housing 20. The movable wall 18 separates a vacuum chamber 22 from a working chamber 24. The vacuum chamber 22 is permanently connected to a vacuum source. By means of the control valve 14 the working chamber 24 is selectively connected to the vacuum chamber 22, and hence to the vacuum source, or separated therefrom, wherein in the latter case the working chamber 24 is connectable to the ambient atmosphere. As soon as the working chamber 24 is connected to the ambient atmosphere, a pressure difference builds up at the movable wall 18, i.e. there is a higher pressure in the working chamber 24 than in the vacuum chamber 22. This pressure difference leads to a servo force that assists a displacement of the control valve housing 16 in FIG. 1 to the left. With the control valve housing 16 a transmission piston 26 moves in axial direction A and transmits this servo force together with the actuating force in FIG. 1 to the left to a master cylinder arrangement.

Further evident from FIG. 1 is a resetting spring 28, which loads the movable wall 18 together with the control valve housing 16 into the starting position shown in FIG. 1.

The booster housing 20 is held together by tie bolts 30, which at their free ends 32, may be fastened to a splashboard of a motor vehicle.

The control valve 14 itself is of an, as such, known construction. It comprises a rubber-elastic reaction element 34, which in the actuation situation behaves quasi-hydraulically. It moreover comprises two valve seats 36 and 38. The valve seat 38 is closed in the non-actuated starting position shown in FIG. 1. It separates the working chamber 24 from the atmosphere.

Figure 5:
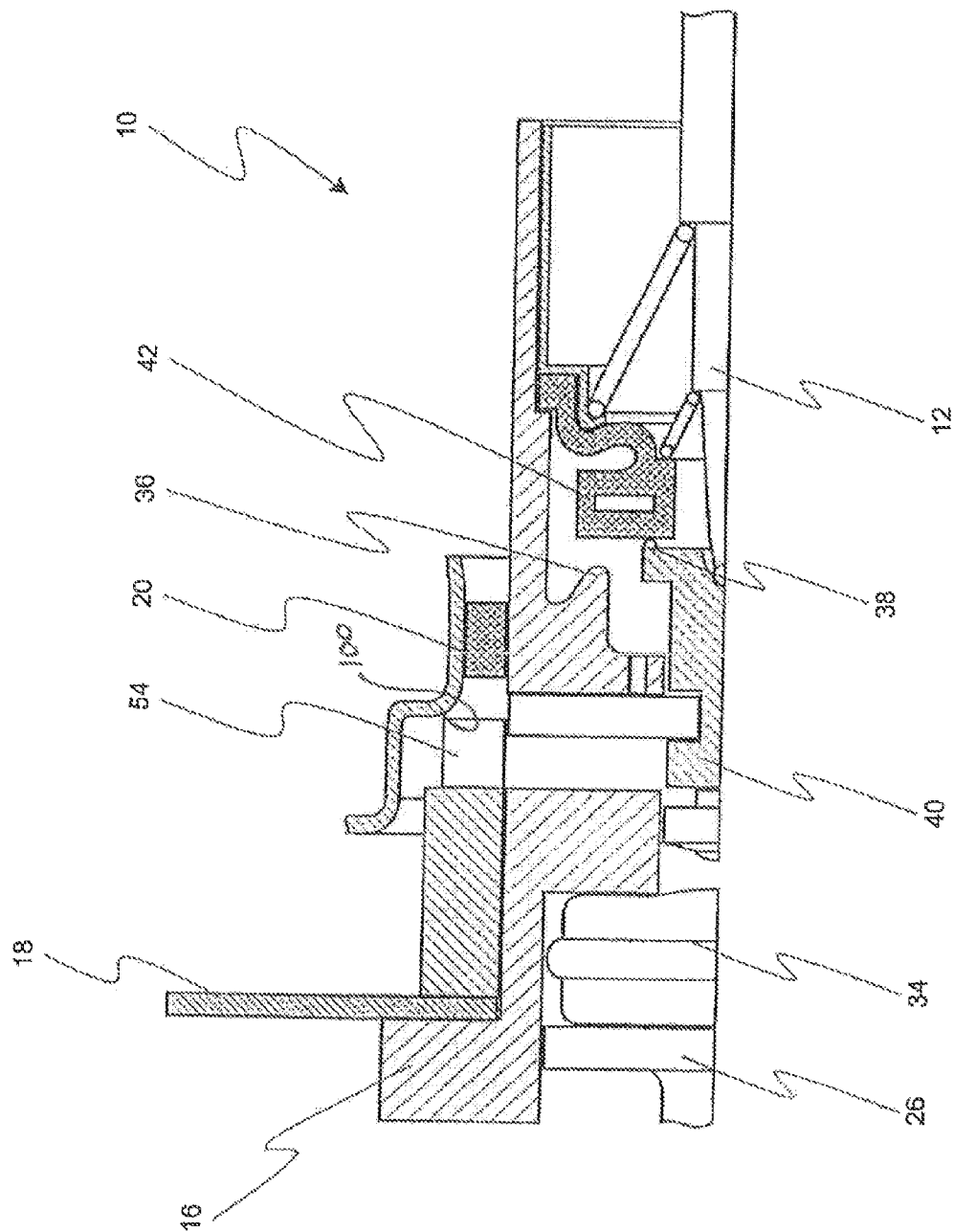
FIG. 5 is a diagrammatic representation for the purpose of explaining the invention.
Figure 6:
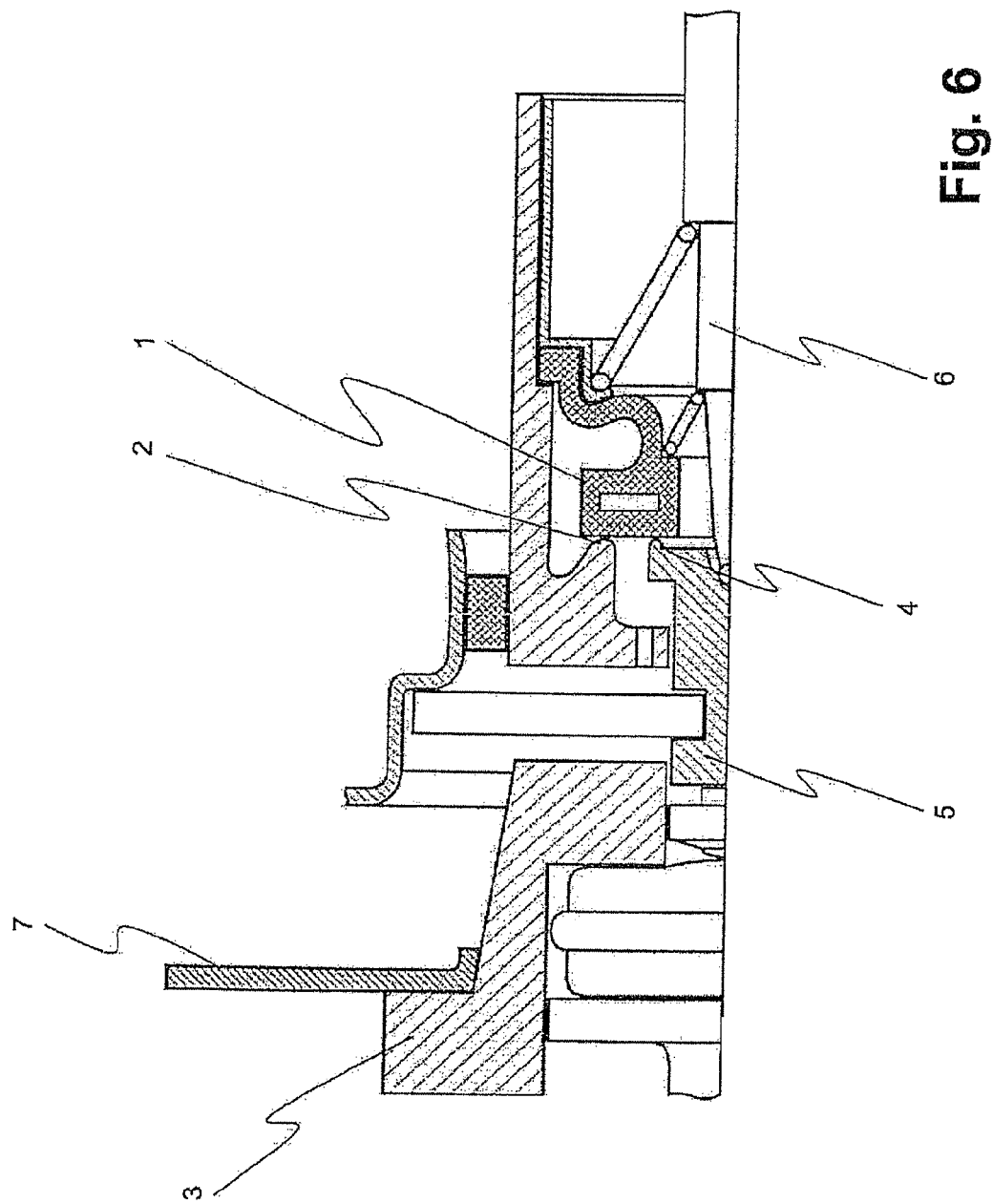
FIG. 6 is a diagrammatic representation corresponding to FIG. 5 of the prior art.

An essential difference of the invention from a conventional brake booster is however that the valve seat 36 in the non-actuated starting position is open so that there is a permanent connection between the working chamber 24 and the vacuum chamber 22. This is evident from the diagrammatic representation of FIG. 5. In this figure it may be seen that a valve element 42 in the non-actuated starting position is held by a transmission element 40, on which the valve seat 38 is formed, at a distance s from the valve seat 36. It is only when this distance s—hereinafter also referred to as idle travel s—has been covered by the force input element 12, with the transmission element 40 being carried along, that the valve element 42 may be laid against the sealing seat 36. The working chamber 24 is consequently pneumatically separated from the vacuum chamber 22. This means that the initial state of a conventional brake booster of prior art that is shown in FIG. 6 is achieved in the brake booster 10 according to the present invention, as shown in FIG. 5, only after completion of the idle travel s as a result of an actuation of the force input element 14. It is only when this idle travel s has been completed and the valve element 42 is laid against the sealing seat 36 that the brake booster 10 according to the invention may become pneumatically active.

Upon a further actuation of the force input element 12 beyond the idle travel s, the transmission element 40 namely simultaneously moves further and its valve seat 38 is lifted off the valve element 42, thereby leading to a fluidic connection between working chamber 24 and ambient atmosphere. As a result, a differential pressure builds up at the movable wall 18. The movable wall 18 consequently moves together with the control valve housing in FIG. 1 to the left until the valve seat 36 closes again. From this state, upon further depression of the brake pedal the force input element 12 may be displaced further to the left, leading to the same functional sequence as described above for a movement out of the starting position. A release of the force input element 12 leads to a resetting movement because of the spring action of the resetting spring 28, resulting in a pressure equalization between working chamber 24 and vacuum chamber 22, until the brake booster 10 is back in its starting position.

To this extent the brake booster after completion of the idle travel s operates like a conventional brake booster. The invention is however directed to the delayed response characteristic of the brake booster. In actual fact, the brake booster according to the present invention upon a displacement of the force input element 12 responds in a delayed manner compared to a conventional brake booster. In other words, the force input element 12 may move only by an idle travel s in FIG. 1 to the left before the previously described operations in the control valve 14 occur, by means of which a pressure difference is generated at the movable wall 18. This is achieved in that the control valve housing 16 is retained in its starting position in a more advanced position compared to the prior art.

Figure 2:
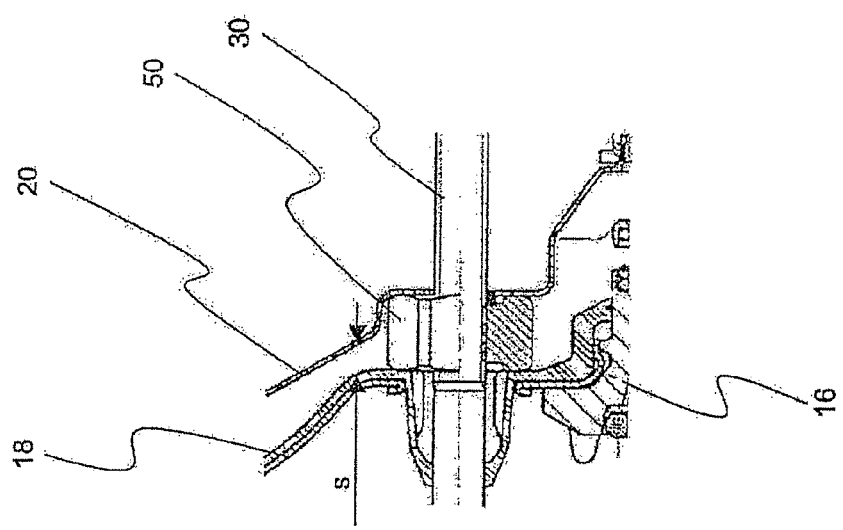
FIG. 2 is an enlarged view of the region denoted by II in FIG. 1 for the purpose of explaining a variant of a stop device.

In a first form of construction of the invention, this advanced positioning of the control valve housing 16 is achieved in that, as shown in FIG. 2, the movable wall 18 that is coupled in a fixed manner for joint movement to the control valve housing 16 is retained relative to the booster housing 20 by means of stop nuts 50 in an advanced starting position, which provides the idle travel s of the force input element 12, until the force input element 12 may effectively come into interaction with the control valve 14. The stop nuts 50 are screwed on the tie bolts 30 of the brake booster 10. They are of such a width that they define the previously described idle travel s. The stop nuts 50 are disposed adjustably on the bolts 30 so that, where necessary, the idle travel s may even be adjusted.

FIG. 3 shows a second constructional variant of the invention. Instead of by means of the stop nuts 50, as shown in FIG. 2, the movable wall 18 is retained by means of local embosses 52 in the booster housing in the advanced starting position, in which the idle travel s (see FIG. 1) is provided. As shown in FIG. 3, the local embosses 52 contact a lay-on face of the movable wall 18. In this way too, the effect may be achieved that upon an actuation of the force input element 12 a response of the control valve occurs only after a delay.

Figure 4:
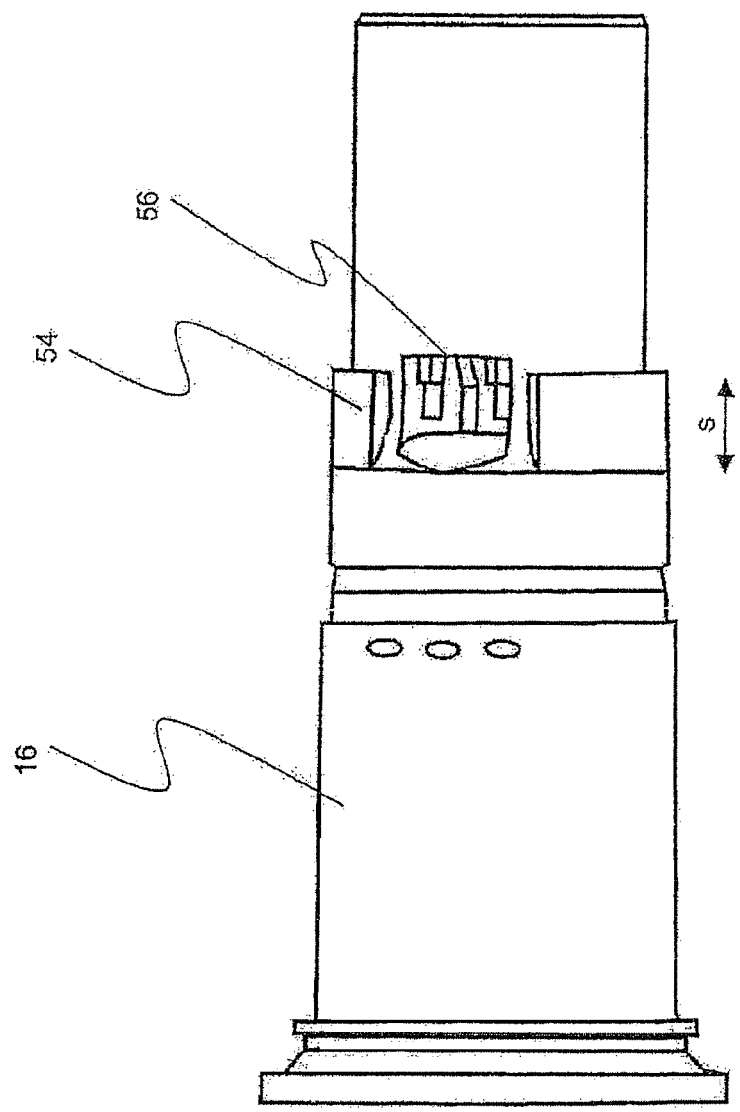
FIG. 4 is a detail representation of a control valve housing of a further alternative form of construction of the invention.

As an alternative to a retaining of the movable wall 18 relative to the booster housing 20 by means of corresponding stops, the third form of construction of the invention, as shown in FIG. 4, provides that the control valve housing 16 is provided with a stop element 54, with which it strikes against the booster housing and is therefore retained in a starting position that guarantees the idle travel s. The stop element 54 in this case is configured as a separate ring that is mounted on the control valve housing 16. Alternatively, integrally formed stops may be provided on the control valve housing 16.

Also evident from FIG. 4 is a hole 56 in the control valve housing 16, through which a stop bar 58 (see FIG. 1) may extend.

With regard to the diagrammatic representation shown in FIG. 5 it should be commented that in this constructional variant the bar 58 may be of a shortened construction because the control valve housing 16 is blocked in its movement relative to the booster housing 20 by means of the stop element 54. The bar 58 therefore merely ensures a restriction of the relative movement between force input element and control valve housing. In this case, the axial dimensioning of the hole 56 co-determines the size of the idle travel s.

With the provision according to the invention of an idle travel s it is possible to achieve the effect that the force input element 12 upon an actuation of the brake pedal may initially be moved without an immediate switchover of the control valve 14 occurring at the same time. The idle travel s therefore represents a first actuation phase, in which the control valve 14 remains passive as regards a build-up of a differential pressure at the movable wall 18 and hence a build-up of a vacuum at the movable wall 18 initially does not occur. In this first actuation phase a regenerative braking operation, for example as a result of the deceleration effect of an electric motor acting as a generator, may be used as a braking effect in the motor vehicle. If however the force input element 12 is actuated to such an extent that it moves beyond the idle travel s, then in addition or as an alternative to the regenerative braking effect of the electric motor a conventional braking effect arises, with which a brake force is generated by means of a master cylinder, which adjoins the transmission piston 26, and a hydraulic braking system.

In FIG. 1 a sensor may be additionally provided, which acquires for example the movements of a magnet moving with the force input element 12 and is therefore able to determine electronically whether the force input element 12 has already moved beyond the idle travel s. In accordance with the acquired movement of the force input element the deceleration effect of the generator may then, where necessary, be disconnected.

The invention provides a simple and reliable way of adapting an, as such, conventional brake booster by means of minor design interventions for use in the situation of a regenerative braking operation, for example in a hybrid vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Brake booster for an automotive brake system with regenerative brake force generation comprising:
   a force input element that is adapted to be coupled to a brake pedal,
   a chamber arrangement having a vacuum chamber and a working chamber that are separated from one another by a movable wall, and
   a control valve, by means of which in accordance with a displacement of the force input element, the working chamber is connectable selectively to the vacuum chamber and the atmosphere for generating and reducing a differential pressure at the movable wall,
   wherein the control valve has a control valve housing that is connected for joint movement to the movable wall,
   wherein, in a first actuation phase of the brake booster from its rest position, the force input element is displaceable relative to the control valve housing by an idle travel, in which the control valve remains non-actuated to suppress a build-up of a differential pressure at the movable wall, and wherein the control valve, in the first actuation phase, provides a fluidic connection between vacuum chamber and working chamber and, in a second actuation phase after exceeding of the idle travel by the force input element, the control valve switches over to build up a differential pressure at the movable wall,
   wherein the control valve has a valve element that may be laid sealingly against a first sealing seat, which is formed on the control valve housing and used for the fluidic separation of vacuum chamber and working chamber, and that may be laid sealingly against a second sealing seat, which is formed on a transmission element and used for the fluidic separation of working chamber and ambient atmosphere, wherein in the first actuation phase, the first sealing seat is lifted off the valve element and the second sealing seat lies sealingly against the valve element,
   wherein a stop device is formed on the control valve housing that determines the idle travel and retains the control valve housing in a starting position associated with the rest position.

2. Brake booster according to claim 1, wherein the stop device is an annular formation that extends around the control valve housing and in the rest position rests against a counterpart stop formation on the booster housing.

3. Brake booster according to claim 2, wherein the stop device is formed integrally on the control valve housing.

4. Brake booster according to claim 1, wherein a stop device is formed on the movable wall and locks the movable wall in a starting position associated with the rest position.

5. Brake booster according to claim 4, wherein the stop device is configured in the form of a lay-on element on at least one tie bolt, which extend through the booster housing.

6. Brake booster according to claim 5, wherein the lay-on element is a setting disk or setting nut that is mountable adjustably on the tie bolt.

7. Brake booster according to claim 4, wherein a plurality of lay-on elements are arranged at regular angular intervals in relation to a centre line of the brake booster.

8. Brake booster according to claim 4, wherein the stop device comprises a lay-on face on the movable wall as well as a corresponding stop face on the booster housing.

9. Brake booster according to claim 1, wherein the brake booster is configured with a displacement detection device for detecting the actuating displacement of the force input element.

10. Automotive brake system comprising a braking system associated with individual wheels, an electric motor workingly coupled to a drive train of the motor vehicle and usable as a generator, and a brake booster according to claim 1, wherein upon an actuation of the force input element in the first actuation phase of the brake booster a deceleration effect occurs by means of the generator effect of the electric motor, wherein a servo force generation by means of a pressure difference at the movable wall does not occur.

11. Automotive brake system according to claim 10, wherein an electronic control device controls the deceleration effect of the electric motor at least in the first actuation phase.

12. Brake booster for an automotive brake system with regenerative brake force generation comprising:
   a force input element that is adapted to be coupled to a brake pedal,
   a chamber arrangement having a vacuum chamber and a working chamber that are separated from one another by a movable wall, and
   a control valve, by means of which in accordance with a displacement of the force input element, the working chamber is connectable selectively to the vacuum chamber and the atmosphere for generating and reducing a differential pressure at the movable wall,
   wherein the control valve has a control valve housing that is connected for joint movement to the movable wall,
   wherein, in a first actuation phase of the brake booster from its rest position, the force input element is displaceable relative to the control valve housing by an idle travel, in which the control valve remains non-actuated to suppress a build-up of a differential pressure at the movable wall, and wherein the control valve, in the first actuation phase, provides a fluidic connection between vacuum chamber and working chamber and, in a second actuation phase after exceeding of the idle travel by the force input element, the control valve switches over to build up a differential pressure at the movable wall,
   wherein the control valve has a valve element that may be laid sealingly against a first sealing seat, which is formed on the control valve housing and used for the fluidic separation of vacuum chamber and working chamber, and that may be laid sealingly against a second sealing seat, which is formed on a transmission element and used for the fluidic separation of working chamber and ambient atmosphere, wherein in the first actuation phase, the first sealing seat is lifted off the valve element and the second sealing seat lies sealingly against the valve element, wherein a stop device is formed on the movable wall and locks the movable wall in a starting position associated with the rest position.

13. Brake booster according to claim 12, wherein a stop device determines the idle travel.

14. Brake booster according to claim 13, wherein the stop device is formed on the control valve housing and retains the control valve housing in a starting position associated with the rest position.

15. Brake booster according to claim 14, wherein the stop device is an annular formation that extends around the control valve housing and in the rest position rests against a counterpart stop formation on the booster housing.

16. Brake booster according to claim 14, wherein the stop device is formed integrally on the control valve housing.

17. Brake booster according to claim 12, wherein the stop device is configured in the form of a lay-on element on at least one tie bolt, which extend through the booster housing.

18. Brake booster according to claim 17, wherein the lay-on element is a setting disk or setting nut that is mountable adjustably on the tie bolt.

19. Brake booster according to claim 12, wherein a plurality of lay-on elements are arranged at regular angular intervals in relation to a centre line of the brake booster.

20. Brake booster according to claim 12, wherein the stop device comprises a lay-on face on the movable wall as well as a corresponding stop face on the booster housing.

21. Brake booster according to claim 12, wherein the brake booster is configured with a displacement detection device for detecting the actuating displacement of the force input element.

22. Automotive brake system comprising a braking system associated with individual wheels, an electric motor workingly coupled to a drive train of the motor vehicle and usable as a generator, and a brake booster according to claim 12, wherein upon an actuation of the force input element in the first actuation phase of the brake booster a deceleration effect occurs by means of the generator effect of the electric motor, wherein a servo force generation by means of a pressure difference at the movable wall does not occur.

23. Automotive brake system according to claim 22, wherein an electronic control device controls the deceleration effect of the electric motor at least in the first actuation phase.

\* \* \* \* \*